United States Patent [19]
Tarran

[11] 4,106,590
[45] Aug. 15, 1978

[54] COMBINED HAND TRUCK AND LADDER

[75] Inventor: Phil Keith Tarran, Carlsbad, Calif.

[73] Assignee: Lords III Research & Development Co., Escondido, Calif.

[21] Appl. No.: 779,334

[22] Filed: Mar. 21, 1977

[51] Int. Cl.² ............................................. B62B 1/20
[52] U.S. Cl. ...................................... 182/20; 280/30
[58] Field of Search ................. 182/20, 21; 280/30, 280/659

[56] References Cited

U.S. PATENT DOCUMENTS

| | | | |
|---|---|---|---|
| 680,402 | 8/1901 | Van Court | 182/20 |
| 2,560,342 | 7/1951 | Hanson | 182/20 |
| 2,820,643 | 1/1958 | Cohn | 280/659 |
| 2,938,734 | 5/1960 | Guimond | 280/30 |
| 3,104,889 | 9/1963 | Branch | 182/20 |

FOREIGN PATENT DOCUMENTS 2,333,457  1/1974  Fed. Rep. of Germany ........... 280/659

Primary Examiner—Reinaldo P. Machado
Attorney, Agent, or Firm—Brown & Martin

[57] ABSTRACT

A combined hand truck and ladder having a frame with a pair of elongated side rails and longitudinally spaced interconnecting cross braces. An upper back frame member is pivotally connected at one end to the upper end of the frame and is pivotally movable from locked positions parallel to the frame to an extended 90° angle positions. The pivotally connected end is spaced a short distance from the end of the frame so that when the frame is inverted, an angled support provides a freely supported ladder. The frame member also has lower wheels and an extended support foot to be used in the hand truck mode.

2 Claims, 8 Drawing Figures

U.S. Patent  Aug. 15, 1978  Sheet 1 of 2  4,106,590
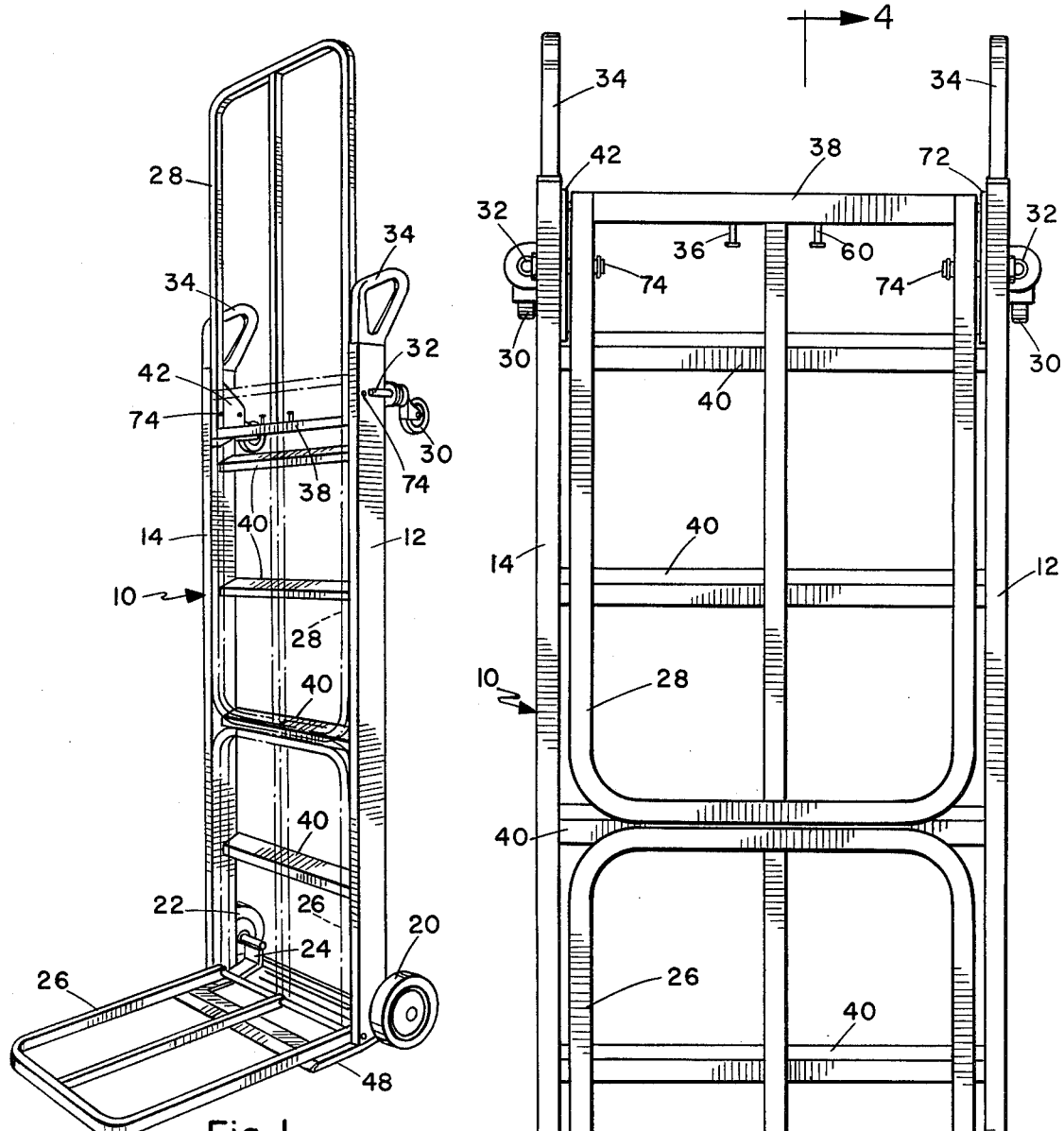
Fig. 1
Fig. 2
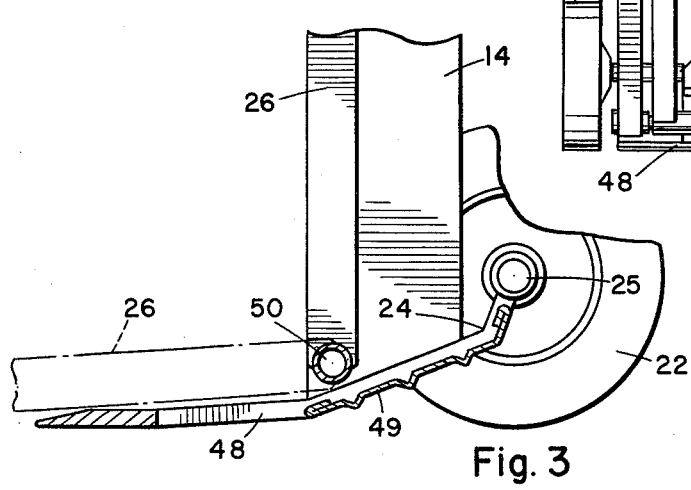
Fig. 3

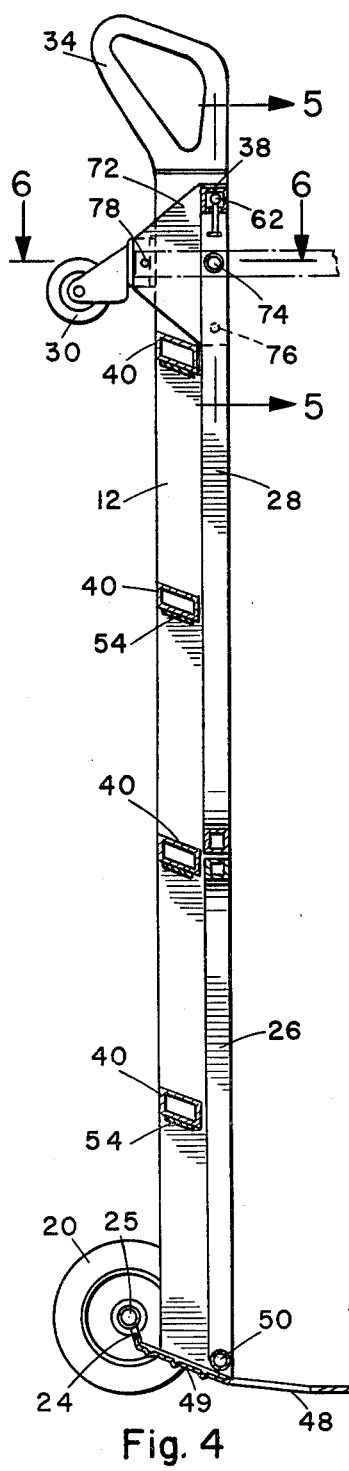

COMBINED HAND TRUCK AND LADDER

BACKGROUND OF THE INVENTION

Hand trucks have been developed over the years that incorporate various features to enable them to be used for more than one purpose. For example, by suitable positioning of the bracing structure, the frame might be used as a ladder. An example of a hand truck and ladder combination is shown in U.S. Pat. No. D198,676. However this type of structure must be supported against a wall or other upright surface in the manner of a conventional ladder, which is not often convenient. Further these structures are used as hand trucks, and not in other modes.

Thus it is advantageous to have a hand truck and ladder combination wherein the hand truck may be used in different modes, such as a cart, or by pivoting an upper back frame member as a free supported ladder.

SUMMARY OF THE INVENTION

The hand truck in the embodiment illustrated herein is an efficient load carrying dolly in normal use. A frame has connected thereto, lower wheels and a load supporting foot and caster type wheels connected to the upper end of the frame. In addition a retractable extension bed for supporting large objects can also be pivoted into position at the lower end. The frame has side rails connected by spaced cross braces that form a load supporting bed. Positioned at the upper end is a pivoting back frame member with the upper pivotal end adjacent the upper end of the frame. This upper back frame member may be pivoted to a retracted positon between the rails forming a flat bed surface for using the truck in the hand truck mode. Also the upper back frame member may be pivoted to an upwardly extended position, where it is locked to extend the length of the hand truck bed.

In another mode, the back frame member may be pivoted to a normal angle with the frame and be locked in position. The pivotally connected end of the back frame member is spaced a short distance from the upper end of the frame. In this mode, the hand truck frame may then be inverted with the upper end of the frame resting on the ground and at a slight angle to vertical; and being supported in this position by the angular support of the locked back frame member. The cross braces in this mode form steps for the use of the frame as a ladder, which ladder is freely supported In still another mode, the lower extension bed may be rotated to the extended position wherein it rests against the extended load supporting foot, with the back frame member being locked in the 90° angle position. The frame is then rotated to a horizontal position and be moved on the upper and lower wheels. The upper wheels swivel to provide directional movement of the cart for carrying the load.

Thus the conversion of the hand truck to that capable of carrying a much larger load or to a directionally movable cart, or to a freely supported ladder; is quickly accomplished in a few seconds without tools.

It is therefore an object of this invention to provide a new and improved combined hand truck and ladder.

It is another object of this invention to provide a new and improved hand truck and ladder that is capable of multiple uses in multiple configurations, from an expanded use as a hand truck and a rollable cart to a freely supported ladder, all of which are accomplished in a few seconds without tools, and without removing or adding any parts.

Other objects and many advantages of this invention will become more apparent upon a reading of the following detailed description and an examination of the drawings, wherein like reference numerals designate like parts throughout and in which:

FIG. 1 is a perspective view of the hand truck and ladder combination in the hand truck mode.

FIG. 2 is an enlarged front elevation view of the hand truck and ladder combination.

FIG. 3 is an enlarged sectional view taken on line 3—3 of FIG. 2.

FIG. 4 is a sectional view taken on line 4—4 of FIG. 2.

FIG. 5 is an enlarged sectional view taken on line 5—5 of FIG. 4.

FIG. 6 is an enlarged sectional view taken on line 6—6 of FIG. 4.

FIG. 7 is a side elevation view of the structure in the step ladder configuration.

FIG. 8 is a side elevation view of the structure in a wheeled cart configuration.

Referring now to the drawings and to FIGS. 1, 2 and 3; the combination hand truck and ladder 10 has a frame with a pair of elongated side rails 12 and 14. These side rails, which may be made of tubing having a rectangular or square cross section, are interconnected by cross braces 40. Each cross brace 40 has a friction pad 54 secured to its under surface and each of the upper and lower surfaces of each cross brace is at an angle to the plane of the side rails 12 and 14. The lower end of the frame has an extended load supporting foot 48 that is connected in a one piece structure to the ends of the respective side rails 12 and 14, and has a front interconnecting portion. The rear ends of the respective foot members 24 extend backward beyond the back side of the side rails 12 and 14, and are connected to and support respective axles 25 that carry the wheels 20 and 22. A bearing plate or scuff plate 49 interconnects the rear ends of the respective supporting foot 48.

Also connected to the lower end of the frame is a pivoting extension tongue 26 that pivots on end 50, whose respective ends are mounted in suitable holes with bushings in the respective lower ends of the side rails 12 and 14. Extension tongue 26 has an enclosed end frame structure that extends about one-third the length of the frame. In the down position, the extension tongue 26 rests on the outer connected end of the supporting foot 48, and in the raised position fits between the elongated side rails 12 and 14. The interconnecting cross braces 40 are spaced back from the forward edge of the side rails 12 and 14, affording a recessed space for receiving the extension tongue 26 and a back frame 28 and maintaining a relatively flush, front surface.

Back frame member 28 is pivotally connected to the upper end of the frame. This back frame member 28 has a generally U-shaped structure similar to the extension tongue 26, and is connected by pin type axles 74 to the respective side rails 14 and 12. The length of the back frame member is about two-thirds the length of the frame.

The pivotal connections 46 and 74 of the back frame member 28 is spaced from the end of the back frame member as well as from the upper end of the side rail members 12 and 14. Each side rail member 12 and 14 has a locking plate 42 and 72, with at least three 90° spaced holes 70, 78 and 76 therein. The corresponding holes in the side plates 42 and 72 are aligned. Positioned in end member 38 are spring biased plunger pins 62 and 66, that are biased outwardly by a resilient center spring 64 to the extended position. In this position, for example, see FIG. 5, the end 68 of pin 62 is slidably moved into the opening 70 locking the back frame 28 in the downward, parallel position. Side pins 36 and 60 move the respective pins 62 and 66 inwardly against spring 64 to release the back frame member from a given locked position.

Thus when side pins 36 and 60 are moved inwardly removing the respective ends 68 of the pin from the holes 70, then the back frame member 28 may be pivotally moved to the position desired and then locked into that position. Thus as illustrated in FIG. 1, the back frame member may be moved to the vertically extended position that lengthens the bed of the hand truck 10. In FIGS. 2 and 4, the back frame member 28 is locked in the downward position for normal hand truck operation. When the back frame member 28 is moved to a normal angle with the frame, then the unit may be used in a ladder configuration. This is accomplished by inverting the combined hand truck and ladder as illustrated in FIG. 7. In this mode, the frame is supported on the handle member ends 34 and on the back frame member 28 for an angular support providing a freely suspended ladder. When in the inverted mode, the respective pads 54 and the cross braces 40 form steps to provide ease of walking up the freely supported ladder.

As illustrated in FIG. 8, the extension tongue 18 may be moved to the extended position with the back frame member in the locked, normal position; thus forming a cart structure. The upper end of the frame has a pair of swivel or caster wheels 30. These caster rollers 30 have a bearing pin structure 32 that is secured to the side of the respective side rails 12 and 14 as illustrated in FIG. 6. So the wheels 30 provide good directional control of the combined hand truck and ladder in the cart mode, as illustrated in FIG. 8.

The simplified, rigid positive-acting structure provides the multi-purpose hand truck and ladder-cart combination with the cooperating movement of the respective extensive tongue, back frame member and upper swivel rollers 30 to provide a unique device.

Having described my invention, I now claim:

1. A combined hand truck and ladder, comprising:
   a frame having a pair of elongated side rails with longitudinally spaced interconnecting cross braces fixed therebetween;
   said frame having an upper end and a lower end, with a load supporting foot projecting from the lower end;
   wheels rotatably mounted on said lower end;
   a back frame member having one end pivotally attached to and between said side rails adjacent the upper end of said frame, said back frame being movable between a closed position within said frame, an extended position substantially perpendicular to the frame, and a further extended position projecting longitudinally beyond said upper end;
   locking means for locking said back frame in each of the positions;
   said frame having hand grips extending from the upper end beyond the pivotal attachment of said back frame;
   said back frame in the perpendicular extended position and said hand grips, in an inverted position of the frame, providing support members for holding the frame in a free standing ladder configuration.

2. A combined hand truck and ladder according to claim 1, wherein:
   said back frame extends approximately two third the length of the frame in the closed position;
   and an extension tongue pivotally attached to said frame adjacent said foot, said extension tongue having a closed position within the frame and forming, with said back frame, a substantially flush load supporting surface.

* * * * *